(12) United States Patent
Kurihara et al.

(10) Patent No.: US 11,097,260 B2
(45) Date of Patent: Aug. 24, 2021

(54) EXHAUST GAS PURIFICATION DEVICE

(71) Applicant: Mitsui Mining & Smelting Co., Ltd., Tokyo (JP)

(72) Inventors: Hiroki Kurihara, Saitama (JP); Yu Sakurada, Saitama (JP); Yusuke Nagai, Saitama (JP); Yoshinori Endo, Saitama (JP); Takeshi Nabemoto, Saitama (JP); Shingo Akita, Saitama (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 16/970,854

(22) PCT Filed: Mar. 19, 2019

(86) PCT No.: PCT/JP2019/011601
§ 371 (c)(1),
(2) Date: Aug. 18, 2020

(87) PCT Pub. No.: WO2019/188620
PCT Pub. Date: Oct. 3, 2019

(65) Prior Publication Data
US 2021/0001315 A1    Jan. 7, 2021

(30) Foreign Application Priority Data
Mar. 30, 2018  (JP) .............................. JP2018-069909

(51) Int. Cl.
*B01J 23/40*    (2006.01)
*B01J 23/42*    (2006.01)
(Continued)

(52) U.S. Cl.
CPC .......... *B01J 35/04* (2013.01); *B01D 53/9472* (2013.01); *B01J 23/44* (2013.01); *B01J 23/464* (2013.01);
(Continued)

(58) Field of Classification Search
CPC ... B01J 23/40; B01J 23/42; B01J 23/44; B01J 23/464; B01J 35/0006; B01J 35/04; B01J 35/1042; B01J 35/1076; F01N 3/2803
See application file for complete search history.

(56) References Cited

U.S. PATENT DOCUMENTS 6,753,294 B1 * 6/2004 Brisley ................. F01N 3/0231
502/439
8,580,705 B2 * 11/2013 Aoki .................... B01D 53/945
502/304
(Continued)

FOREIGN PATENT DOCUMENTS

CN    102026707 A    4/2011
EP    3207989 A1    8/2017
(Continued)

OTHER PUBLICATIONS

International Search Report (ISR) dated May 28, 2020 filed in PCT/JP2019/011601.

*Primary Examiner* — Cam N. Nguyen
(74) *Attorney, Agent, or Firm* — Rankin, Hill & Clark LLP (57) ABSTRACT

A substrate (11) includes an inflow-side cell (21), an outflow-side cell (22), and a porous, gas-permeable partition wall (23) that separates the inflow-side cell (21) and the outflow-side cell (22) from each other, and also includes a first catalyst portion (14) that is provided on a side of the partition wall (23) that faces the inflow-side cell (21) at least at a portion in upstream side in an exhaust gas flow direction, and a second catalyst portion (15) that is provided on a side
(Continued)

of the partition wall that faces the outflow-side cell at least at a portion in downstream side. With respect to a pore volume of pores with a pore size of 10 to 18 μm, when a measured value of the pore volume in the first catalyst portion (14) and the partition wall (23) within a region where the first catalyst portion (14) is provided is defined as a first pore volume, and a measured value of the pore volume in the second catalyst portion (15) and the partition wall (23) within a region where the second catalyst portion (15) is provided is defined as a second pore volume, the first pore volume is greater than the second pore volume. A catalytically active component contained in the first catalyst portion (14) and a catalytically active component contained in the second catalyst portion (15) are of different types.

3 Claims, 2 Drawing Sheets (51) Int. Cl.

| | | |
|---|---|---|
| *B01J 23/44* | (2006.01) | |
| *B01J 23/46* | (2006.01) | |
| *B01J 35/00* | (2006.01) | |
| *B01J 35/04* | (2006.01) | |
| *B01J 35/10* | (2006.01) | |
| *F01N 3/28* | (2006.01) | |
| *B01D 53/94* | (2006.01) | |

(52) U.S. Cl.
CPC ....... *B01J 35/0006* (2013.01); *B01J 35/1042* (2013.01); *B01J 35/1076* (2013.01); *F01N 3/2803* (2013.01); *B01D 2255/1023* (2013.01); *B01D 2255/1025* (2013.01); *B01D 2255/908* (2013.01); *B01D 2255/9032* (2013.01); *B01D 2255/9155* (2013.01); *B01D 2255/9205* (2013.01); *F01N 2330/02* (2013.01); *F01N 2330/32* (2013.01); *F01N 2370/02* (2013.01)

(56) References Cited

U.S. PATENT DOCUMENTS

| | | | |
|---|---|---|---|
| 9,440,223 B2* | 9/2016 | Aoki | B01D 53/945 |
| 10,071,368 B2* | 9/2018 | Onoe | B01J 35/0006 |
| 10,076,725 B2* | 9/2018 | Onoe | F01N 3/0864 |
| 10,086,363 B2* | 10/2018 | Onoe | B01J 23/63 |
| 10,125,649 B2* | 11/2018 | Onoe | F01N 3/035 |
| 10,159,934 B2* | 12/2018 | Kitamura | B01J 35/04 |
| 10,159,935 B2* | 12/2018 | Onoe | F01N 3/0222 |
| 10,344,655 B2* | 7/2019 | Onoe | F01N 3/035 |
| 10,357,744 B2* | 7/2019 | Ohashi | B01J 35/0006 |
| 2008/0125316 A1* | 5/2008 | Noda | B01J 35/10 |
| | | | 502/439 |
| 2011/0071019 A1 | 3/2011 | Hanaki et al. | |
| 2011/0079001 A1* | 4/2011 | Sakurai | F01N 13/0097 |
| | | | 60/295 |
| 2012/0009093 A1* | 1/2012 | Mizutani | C04B 41/009 |
| | | | 422/177 |
| 2016/0288096 A1* | 10/2016 | Fujiwara | B01D 53/945 |
| 2017/0296969 A1 | 10/2017 | Ohashi et al. | |

FOREIGN PATENT DOCUMENTS

| | | |
|---|---|---|
| JP | 2008-151100 A | 7/2008 |
| JP | 2016-78016 A | 5/2016 |
| JP | 2016-185516 A | 10/2016 |
| WO | 2013/160678 A2 | 10/2013 |
| WO | 2017/175574 A1 | 10/2017 |

\* cited by examiner

EXHAUST GAS PURIFICATION DEVICE

TECHNICAL FIELD

The present invention relates to an exhaust gas purification catalyst.

BACKGROUND ART

For internal combustion engines including diesel engines and gasoline engines, in order to comply with fuel economy standards that are becoming stricter year by year especially for gasoline engines, gasoline direct injection engines (hereinafter also referred to as GDI engines) are now widely used. It is known that, even though GDI engines have low fuel consumption and provide high output, the emission amount of particulate matter (hereinafter also referred to as PM, including soot) in exhaust gas is 5 to 10 times or more higher than that of conventional port fuel injection engines. In order to comply with environmental restrictions for PM emission, vehicles mounted with a gasoline engine such as a GDI engine are also required to include a filter (gasoline particulate filter, hereinafter also referred to as GPF) that has a PM collection function, as with diesel engines.

In general, the installation space for an exhaust gas purification catalyst is limited, and thus an exhaust gas purification catalyst in which a noble metal three-way catalyst such as Pd, Pt, or Rh is supported on a filter as described above and that collects PM and purifies nitrogen oxide ($NO_x$), carbon monoxide (CO), hydrocarbon (HC), and the like has come into use in recent years.

For example, Patent Literature 1 discloses a catalyzed filter including a porous substrate, wherein the porous substrate is coated with a three-way catalyst washcoat composition containing a plurality of noble metals, such as platinum and rhodium, and the three-way catalyst washcoat is arranged along an axis direction on the porous substrate between a first zone including an inlet surface of a first substrate length that is shorter than the total substrate length and a second zone including an outlet surface of a second substrate length that is shorter than the total substrate length.

Patent Literature 2 discloses an exhaust gas purification catalyst that includes: a wall flow structure substrate including an inlet cell in which only an exhaust gas inflow side end portion is open, an outlet cell that is adjacent to the inlet cell and in which only an exhaust gas outflow side end portion is open, and a porous partition wall that separates the inlet cell and the outlet cell; an upstream catalyst layer that is provided inside the partition wall in an upstream portion of the substrate in an exhaust gas flow direction including the exhaust gas inflow side end portion of the substrate; and a downstream catalyst layer that is provided inside the partition wall in a downstream portion of the substrate in the exhaust gas flow direction including the exhaust gas outflow side end portion, wherein a noble metal contained in the upstream catalyst layer and a noble metal contained in the downstream catalyst layer are different.

CITATION LIST

Patent Literature

Patent Literature 1: WO 2013/160678
Patent Literature 2: US 2017/296969A1

SUMMARY OF INVENTION

In a three-way catalyst containing a catalytically active component, harmful components, such as $NO_x$, CO, and HC, can be efficiently removed by using a plurality of catalytically active components.

However, if a plurality of catalytically active components are used in a single catalyst layer as is the case with the technology disclosed in Patent Literature 1, sintering of the catalytically active components occurs and degrades dispersiveness because exhaust gas of gasoline engines such as GDI engines generally has a high temperature, and, accordingly, CO adsorption performance and oxygen storage performance (OSC, OSC is an abbreviation for oxygen storage capacity) are poor after thermal endurance, resulting in the problem in that sufficient exhaust gas purification performance cannot be obtained.

On the other hand, in the case where different catalytically active components are simply contained in an upstream portion and a downstream portion, respectively, of the partition wall of the cells as disclosed in Patent Literature 2, if exhaust gas flows at a high space velocity, the exhaust gas cannot appropriately pass through the catalyst layers, and sufficient exhaust gas purification performance cannot be achieved.

Therefore, it is an object of the present invention to provide an exhaust gas purification catalyst with which the above-described problems of conventional technologies can be addressed.

The inventors of the present invention conducted in-depth studies on the configuration, of a filter catalyst that has a wall flow structure, for improving CO adsorption performance and oxygen storage performance (OSC) after thermal endurance.

As a result, a filter catalyst for collecting PM in which catalytically active components were highly dispersed and that had excellent CO adsorption performance and oxygen storage performance (OSC) after thermal endurance and had good exhaust gas purification performance even under conditions of a high space velocity during high speed driving or the like was obtained by providing a first catalyst layer and a second catalyst layer containing different catalytically active components on an upstream side and a downstream side, respectively, in an exhaust gas flow direction, and providing a specific relationship between pore volumes in two catalyst layer-forming regions of a cell partition wall.

The present invention has been made based on the findings described above, and provides an exhaust gas purification catalyst including:

a substrate; and
a catalyst portion provided in the substrate,
the substrate including:
an inflow-side cell including a space whose inflow side in an exhaust gas flow direction is open and whose outflow side is closed;
an outflow-side cell including a space whose inflow side in the exhaust gas flow direction is closed and whose outflow side is open; and
a porous partition wall that separates the inflow-side cell and the outflow-side cell from each other, and
the catalyst portion including:
a first catalyst portion that is provided at least on a portion of a side of the partition wall that faces the inflow-side cell, the portion being located on an upstream side in the flow direction; and
a second catalyst portion that is provided at least on a portion of a side of the partition wall that faces the outflow-side cell, the portion being located on a downstream side in the flow direction, wherein, with respect to a pore volume of pores with a pore size of 10 to 18 μm, when a measured value of the pore volume in the first catalyst portion and the partition wall within a region where the first catalyst portion is provided is defined as a first pore volume, and a measured value of the pore volume in the second catalyst portion and the partition wall within a region where the second catalyst portion is provided is defined as a second pore volume, the first pore volume is greater than the second pore volume, and both the first catalyst portion and the second catalyst portion contain a catalytically active component, and the catalytically active component contained in the first catalyst portion and the catalytically active component contained in the second catalyst portion are of different types.

DESCRIPTION OF EMBODIMENT

Hereinafter, the present invention will be described by way of a preferred embodiment thereof, but the present invention is not limited to the embodiment given below.

Figure 1:
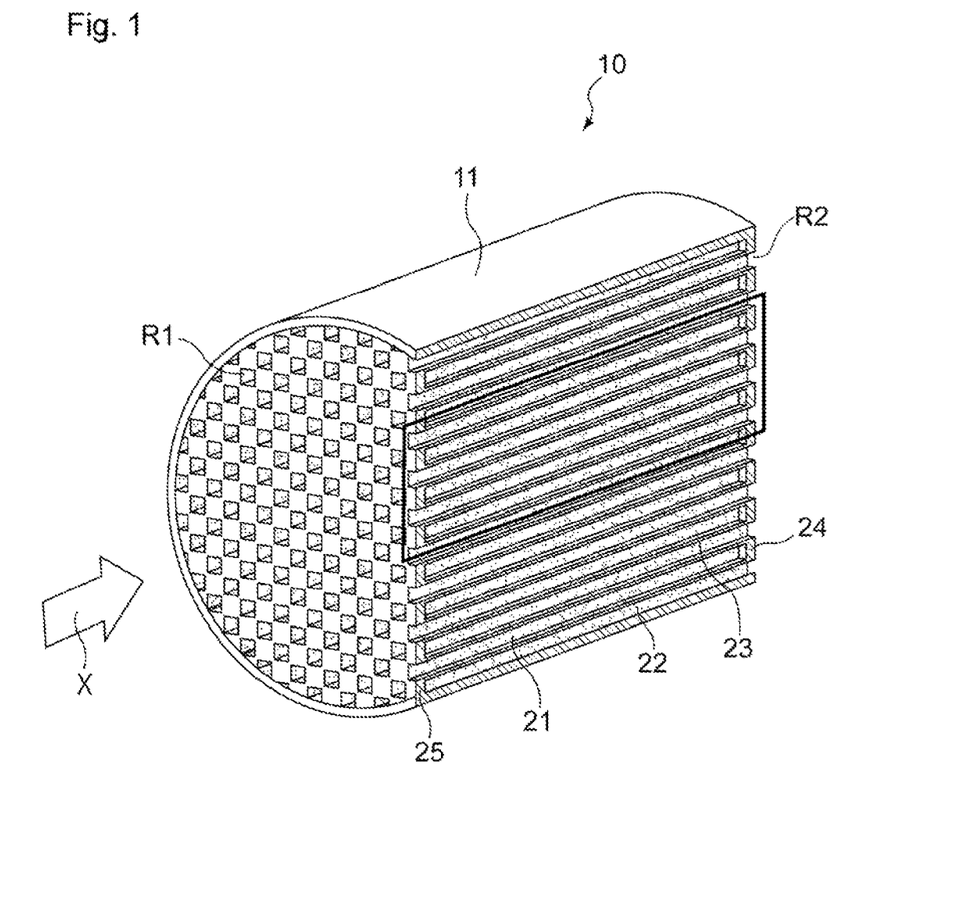
FIG. 1 is a schematic diagram of an exhaust gas purification catalyst according to an embodiment of the present invention.
Figure 2:
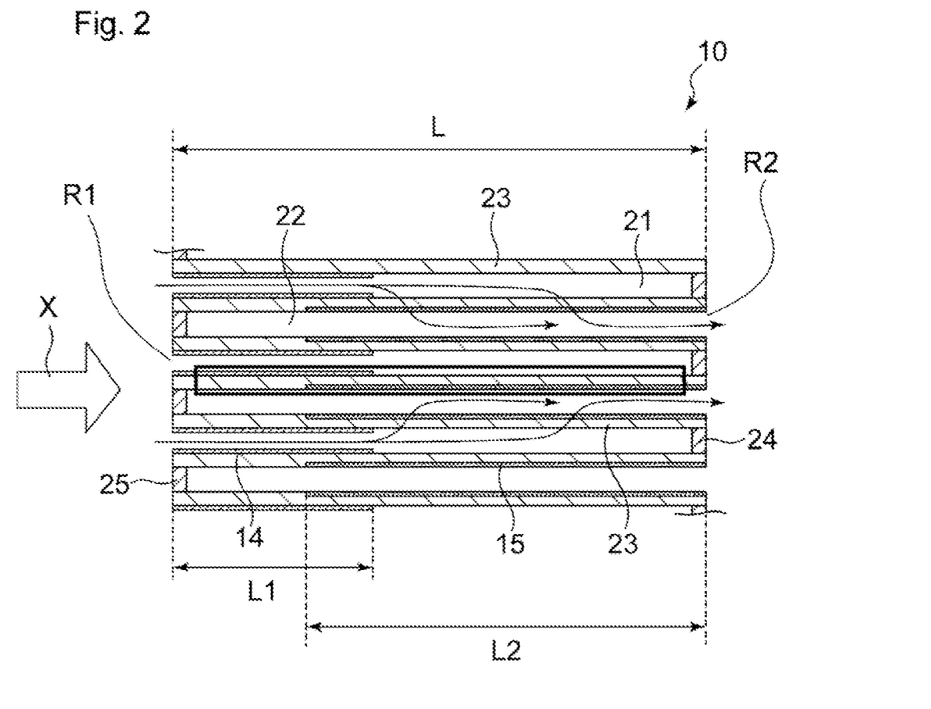
FIG. 2 is a diagram showing a cross section of a portion surrounded by a rectangle in FIG. 1, taken along the axis direction of a substrate.
Figure 3:
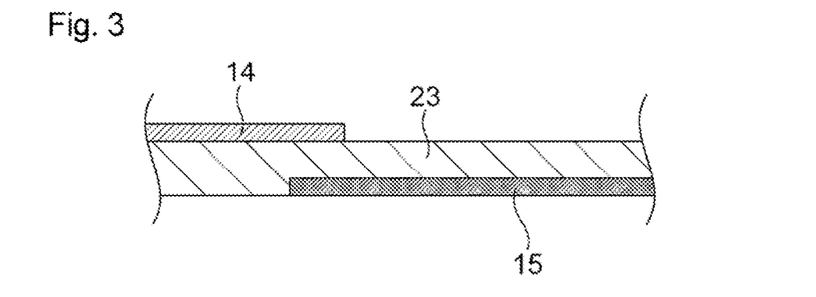
FIG. 3 is an enlarged view of a portion surrounded by a rectangle in FIG. 2.

FIGS. 1 to 3 show an example of an exhaust gas purification catalyst 10 according to the present embodiment. The diagrams merely show a schematic example of an exhaust gas purification catalyst, and are not intended to limit the present invention in any way.

The exhaust gas purification catalyst 10 is provided in an exhaust path of an internal combustion engine such as a diesel engine or a gasoline engine, in particular, a GDI engine for vehicles. The exhaust gas purification catalyst 10 is used as, for example, a GPF.

As shown in FIG. 1, the exhaust gas purification catalyst 10 includes a substrate 11 that has a so-called wall flow structure. Substrates made of various materials can be used as the substrate 11. For example, a substrate made of ceramic such as cordierite or silicon carbide (SiC) or an alloy such as stainless steel can be favorably used. Usually, the substrate has a cylindrical outer shape as shown in FIG. 1, and is disposed in an exhaust gas flow path such that the axis direction of the cylindrical outer shape substantially matches an exhaust gas flow direction X. FIG. 1 shows a substrate that has a circular cylindrical outer shape as an example. However, the outer shape of the substrate as a whole may be, instead of a circular cylindrical shape, an elliptic cylindrical shape or a polygonal cylindrical shape.

As shown in FIG. 1, the substrate 11 includes an inflow-side cell 21 that is composed of a space that extends in the exhaust gas flow direction X, and whose inflow side in the flow direction X is open but whose outflow side is closed, and an outflow-side cell 22 that is composed of a space that extends in the flow direction X, and whose inflow side in the flow direction X is closed but whose outflow side is open.

The inflow-side cell 21 is closed by a sealing portion 24 at an exhaust gas outflow-side end portion located at a downstream end portion R2 in the exhaust gas flow direction X, but is open at an exhaust gas inflow-side end portion located at an upstream end portion R1. The outflow-side cell 22 is closed by a sealing portion 25 at the exhaust gas inflow-side end portion located at the upstream end portion R1, but is open at the exhaust gas outflow-side end portion located at the downstream end portion R2. The inflow-side cell 21 and the outflow-side cell 22 are configured such that a gas, a liquid, and the like can flow through the open end portions, but the flow of exhaust gas is blocked at the sealing portion 24 and the sealing portion 25 where the inflow-side cell 21 and the outflow-side cell 22 are closed. The inflow-side cell 21 and the outflow-side cell 22 are spaces in the form of a hole with a bottom and extend in the axis direction of the substrate 11. The shape of the spaces in a cross section perpendicular to the axis direction of the substrate 11 may be any geometric shape such as a quadrilateral including a square, a parallelogram, a rectangle, and a trapezoid, a polygon including a triangle, a hexagon, and an octagon, a circular shape, and an elliptic shape.

A porous partition wall 23 is formed between the inflow-side cell 21 and the outflow-side cell 22 that is provided adjacent to the inflow-side cell 21 so as to divide the inflow-side cell 21 and the outflow-side cell 22. The inflow-side cell 21 and the outflow-side cell 22 are separated by the partition wall 23. The partition wall 23 forms inner-side walls of the inflow-side cell 21 and the outflow-side cell 22, which are each in the form of a hole with a bottom. The partition wall 23 has a porous structure that allows a gas such as exhaust gas to pass therethrough. The thickness of the partition wall 23 is preferably, for example, 150 to 400 μm.

In the substrate 11, a catalyst portion that contains a catalytically active component is provided. As shown in FIG. 2, the catalyst portion includes a first catalyst portion 14 that is in the form of a layer (hereinafter also referred to as "first catalyst layer 14") and a second catalyst portion 15 that is in the form of a layer (hereinafter also referred to as "second catalyst layer 15"). The first catalyst portion 14 is provided on, at least a portion on the upstream side in the exhaust gas flow direction X (hereinafter also referred to as "direction X") of, a side of the partition wall 23 that faces the inflow-side cell 21. The second catalyst portion 15 is provided on, at least a portion on the downstream side in the exhaust gas flow direction X of, a side of the partition wall 23 that faces the outflow-side cell 22.

The length L1 (see FIG. 2) of the first catalyst layer 14 in the direction X is preferably 20% to 60%, and more preferably 30% to 50%, of the length L (see FIG. 2) of the substrate 11 in the direction X, from the viewpoint of improving exhaust gas purification performance while reducing pressure loss and the viewpoint of achieving favorable PM collection performance. Moreover, the length L2 (see FIG. 2) of the second catalyst layer 15 in the direction X is preferably 50% to 90%, and more preferably 60% to 80%, of the length L of the substrate 11 in the direction X, from the viewpoint of improving exhaust gas purification performance while reducing pressure loss and the viewpoint of achieving favorable PM collection performance. Note that the first catalyst layer 14 is preferably formed beginning at the upstream end portion in the exhaust gas flow direction, and the second catalyst layer 15 is preferably formed beginning at the downstream end portion.

The total length L1+L2 of the length L1 of the first catalyst layer 14 in the direction X and the length L2 of the second catalyst layer 15 in the direction X is preferably longer than the length L of the substrate 11 in the direction X, from the viewpoint of improving exhaust gas purification performance, and (L1+L2)/L is preferably 1.05 or greater. From the viewpoint of reducing pressure loss, the upper limit of (L1+L2)/L is preferably 1.40 or less, more preferably 1.35 or less, and even more preferably 1.30 or less.

Note that the lengths of the first catalyst layer 14 and the second catalyst layer 15 can be measured using the following method. That is to say, it is preferable to visually measure the lengths at any ten positions on a cross section of the exhaust gas purification catalyst 10 taken along the axis direction of the substrate 11 and obtain the lengths of the respective catalyst layers by calculating the averages. If the boundary between the first catalyst layer 14 and the second catalyst layer 15 in the exhaust gas flow direction cannot be visually determined, the compositions at multiple positions (e.g., 8 to 16 positions) on the exhaust gas purification catalyst along the exhaust gas flow direction can be analyzed, and the boundary can be identified based on the concentrations of the catalytically active components at the respective positions. The concentrations of the catalytically active components at the respective positions can be obtained by, for example, X-ray fluorescence analysis (XRF) or ICP emission spectrometry (ICP-AES).

The first catalyst layer 14 preferably extends from the upstream end portion R1 of the substrate 11 in the direction X toward the downstream side, from the viewpoint of improving exhaust gas purification performance while ensuring ease of production. Similarly, the second catalyst layer 15 preferably extends from the downstream end portion R2 of the substrate 11 in the direction X toward the upstream side.

The catalytically active component contained in the first catalyst layer 14 and the catalytically active component contained in the second catalyst layer 15 are of different types. Examples of the catalytically active components include platinum group metals. Specifically, one or two or more of platinum (Pt), palladium (Pd), rhodium (Rh), ruthenium (Ru), iridium (Ir), and osmium (Os) can be used. The expression "the catalytically active component contained in the first catalyst layer 14 and the catalytically active component contained in the second catalyst layer 15 are of different types" means that the main catalytically active component contained in the first catalyst layer 14, that is, a catalytically active component contained in the first catalyst layer 14 in the greatest amount differs from the main catalytically active component contained in the second catalyst layer 15, that is, a catalytically active component contained in the second catalyst layer 15 in the greatest amount.

For example, if the first catalyst layer 14 contains palladium (Pd) and rhodium (Rh) as catalytically active components, and palladium (Pd) is contained in a greater amount than rhodium (Rh), the main catalytically active component of the first catalyst layer 14 is palladium (Pd). Also, if the second catalyst layer 15 contains palladium (Pd) and rhodium (Rh) as catalytically active components, and rhodium (Rh) is contained in a greater amount than palladium (Pd), the main catalytically active component of the second catalyst layer 15 is rhodium (Rh). In this case, it can be judged that the catalytically active component contained in the first catalyst layer 14 and the catalytically active component contained in the second catalyst layer 15 are of different types.

The first catalyst layer 14 and the second catalyst layer 15 preferably each contain substantially only one catalytically active component, from the viewpoint of achieving excellent CO adsorption performance and OSC performance after thermal endurance by increasing the degree of dispersion of the catalytically active components.

Note that another catalyst layer may be further formed on the first catalyst layer 14 that is formed on the substrate 11. For example, the materials listed above for the first catalyst layer 14 and the second catalyst layer 15 of the present invention may be used as the material of the other catalyst layer. In particular, in the present invention, the catalytically active component used in the other catalyst layer preferably differs from the catalytically active component used in the first catalyst layer 14, from the viewpoint of achieving a high CO adsorption amount and a high OSC amount after thermal endurance.

The amount of catalytically active component contained in a catalyst layer occupies preferably 0.001 mass % or greater, more preferably 0.01 mass % or greater, and most preferably 0.05 mass % or greater of the catalyst layer, from the viewpoint of exhaust gas purification performance. On the other hand, the upper limit of this amount is preferably 25 mass % or less, more preferably 20 mass % or less, and particularly preferably 15 mass % or less of the catalyst layer, from the viewpoint of the balance between exhaust gas purification performance and cost.

Particularly preferably, the first catalyst layer 14 and the second catalyst layer 15 contain a noble metal selected from platinum (Pt), palladium (Pd), and rhodium (Rh), the second catalyst layer 15 is selected from platinum (Pt), palladium (Pd), and rhodium (Rh), and one of the catalyst layers contains a noble metal other than the noble metal contained in the other catalyst layer, from the viewpoint of efficiently removing exhaust gas components such as $NO_x$, CO, and HC, and in particular, the viewpoint of achieving good CO adsorption performance and OSC performance after thermal endurance. In particular, from the viewpoint of improving oxidation performance such as CO adsorption performance after thermal endurance, the first catalyst layer 14 preferably contains a noble metal selected from palladium (Pd) and platinum (Pt), and more preferably contains palladium (Pd). Moreover, from the viewpoint of improving $NO_x$ reduction performance, the second catalyst layer 15 preferably contains rhodium (Rh).

From the viewpoint of improving heat resistance of the exhaust gas purification catalyst 10 even further, the amount of catalytically active component contained in the first catalyst layer 14 is preferably from 0.1 to 15 g, and more preferably from 1 to 8 g, per liter of substrate volume, and the amount of catalytically active component contained in the second catalyst layer 15 is preferably from 0.01 to 5 g, and more preferably from 0.1 to 1 g, per liter of substrate volume.

Moreover, from the viewpoint of improving exhaust gas purification performance during start-up, the mass of catalytically active component contained in the first catalyst layer 14 is preferably greater than the mass of catalytically active component contained in the second catalyst layer 15, and is more preferably 1.1 times or more, particularly preferably from 1.3 to 20 times, and even more preferably from 1.5 to 15 times greater than the mass of catalytically active component contained in the second catalyst layer 15.

As used herein, the substrate volume refers to the volume including not only the substrate portion but also the first catalyst layer 14 and the second catalyst layer 15, the pores in the partition wall 23, as well as the spaces in the cells 21 and 22.

In the exhaust gas purification catalyst 10, with respect to the volume of pores with a pore size of 10 to 18 µm, when a measured value of the pore volume in the first catalyst layer 14 and the partition wall 23 within a region where the first catalyst layer 14 is provided is defined as a first pore volume, and a measured value of the pore volume in the second catalyst portion and the partition wall 23 within a region where the second catalyst layer 15 is provided is defined as a second pore volume, the first pore volume is greater than the second pore volume. In the present description, the "pore size" refers to the pore diameter.

A wall flow-type substrate used in a GPF usually has a pore size peak derived from the substrate itself within a range of 10 to 18 μm or near this range. Therefore, the first pore volume greater than the second pore volume indicates that, in a partition wall region, the extent to which the second catalyst layer enters the inside of the partition wall is greater than that of the first catalyst layer. The inventors of the present invention have found that exhaust gas purification performance during high speed driving is improved by the catalyst having this configuration. One of the reasons for this is that, with this configuration, the flow of exhaust gas is not obstructed and is likely to come into contact with both the first catalyst layer 14 and the second catalyst layer 15, and accordingly, the efficiency of contact with the catalytically active components is favorable.

As in the present invention, when the catalytically active component contained in the first catalyst layer 14 and the catalytically active component contained in the second catalyst layer 15 differ from each other, and the first catalyst layer 14 and the second catalyst layer 15 have the above-described relationship in terms of pore volume, an exhaust gas purification catalyst having excellent CO adsorption performance and oxygen storage performance (OSC) after thermal endurance and having good exhaust gas purification performance even under conditions of a high space velocity during high speed driving or the like can be obtained.

The first pore volume, which is the pore volume measured in the first catalyst layer 14 and the partition wall within the region where the first catalyst layer 14 is provided, can be measured based on the following method using samples obtained by cutting a portion of the partition wall 23 in which the first catalyst layer 14 is formed, but the second catalyst layer 15 is not formed. Also, the second pore volume can be measured based on the following method using samples obtained by cutting a portion of the partition wall 23 in which the second catalyst layer 15 is formed, but the first catalyst layer 14 is not formed.

A specific method of preparing samples is, for example, as described below. When cutting the partition wall, the partition wall is preferably cut along a cross section perpendicular to the axis direction of the substrate 11.

Preparation of samples for measuring the first pore volume: 1 cm$^3$ cubes (cubes with each side having a length of 1 cm) are cut out at a position spaced apart from the upstream end portion R1 of the substrate by a distance corresponding to 10% of the overall length L.

Preparation of samples for measuring the second pore volume: 1 cm$^3$ cubes (cubes with each side having a length of 1 cm) are cut out at a position spaced apart from the downstream end portion R2 of the substrate by a distance corresponding to 10% of the overall length L.

The number of samples: five samples are prepared for each of the first pore volume and the second pore volume.

A specific method of measuring pore volume is as follows.

The pore volume is determined based on a mercury intrusion porosimetry according to JIS R 1655:2003. To be specific, a cut-out sample is dried at 150° C. for one hour, and thereafter the pore volume of the sample is measured at room temperature (20° C.) using a mercury intrusion porosimeter for determining pore distribution (AutoPore IV 9520 available from Micromeritics Instrument Corporation). The mercury intrusion pressure is set to 0.0048 MPa at the start of measurement, and the maximum mercury intrusion pressure is set to 255.1060 MPa. Pore volume is measured at a total of 131 pressure points including these values. Each instance of pressure application is maintained for 10 seconds.

From the viewpoint of improving exhaust gas purification performance during high speed driving, the ratio of the second pore volume V2 to the first pore volume V1 (V2/V1) of the exhaust gas purification catalyst 10 is preferably 0.95 or less, more preferably 0.8 or less, and particularly preferably 0.7 or less. On the other hand, from the viewpoint of reducing pressure loss, the ratio of the second pore volume V2 to the first pore volume V1 (V2/V1) is preferably 0.4 or greater, and more preferably 0.5 or greater.

In order that the first pore volume is greater than the second pore volume, the particle sizes of metal oxide particles constituting the first catalyst layer 14 and the second catalyst layer 15, the coating amounts of the first catalyst layer 14 and the second catalyst layer 15, the calcining temperatures for producing the first catalyst layer 14 and the second catalyst layer 15, the viscosities of slurries, and/or whether or not a pore-forming material is used can be adjusted. For example, the first pore volume can be easily made greater than the second pore volume, and thereby the above-described V2/V1 value can be set to be not greater than the above-described upper limit, by setting the particle size of the metal oxide constituting the first catalyst layer 14 to be a particle size that makes it difficult for the particles to enter the pores of the partition wall 23, and setting the particle size of the metal oxide constituting the second catalyst layer 15 to be a particle size that makes it easy for the particles to enter the pores of the partition wall 23. However, the present invention is not limited to this configuration. In order to set the above-described V2/V1 value to be not less than the above-described lower limit, in addition to the particle sizes of the metal oxide particles constituting the first catalyst layer 14 and the second catalyst layer 15, the coating amounts of the first catalyst layer 14 and the second catalyst layer 15 or the like can be adjusted.

A preferred composition of the first catalyst layer 14 will be further described. It is preferable that the first catalyst layer 14 further contains a carrier component that supports the catalytically active component, or a component serving as a catalytic promoter, from the viewpoint of causing the catalytically active component to efficiently exhibit exhaust gas purification performance. Metal oxides may be used as the carrier component or the component serving as a catalytic promoter, and specific examples thereof include an inorganic oxide that acts as an oxygen storage component (also referred to as "OSC material") and an inorganic oxide other than an oxygen storage component. In the first catalyst layer 14, it is preferable that both an inorganic oxide that acts as an oxygen storage component and an inorganic oxide other than an oxygen storage component support the catalytically active component.

In the present description, the expression "supported" refers to a state in which a catalytically active component is physically or chemically adsorbed or held on an outer surface of a component, or inner surfaces of pores of a component. Specifically, whether a particle supports another particle can be judged by, for example, checking whether the particle and the other particle are present in the same region in an elemental map obtained by EDS analysis of a cross-section of the exhaust gas purification catalyst 10, and if it is confirmed that the particles are present in the same region, it can be judged that the particle "supports" the other particle.

As the inorganic oxide that acts as an oxygen storage component, any inorganic oxide that is a metal oxide that is multivalent and is capable of storing oxygen can be used. Examples thereof include $CeO_2$, a ceria-zirconia composite oxide (hereinafter also referred to as $CeO_2$—$ZrO_2$), iron oxide, and copper oxide. In addition thereto, an oxide of a rare earth element other than Ce is preferably used from the viewpoint of thermal stability and the like. Examples of the oxide of a rare earth element other than Ce include $Sc_2O_3$, $Y_2O_3$, $La_2O_3$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, and $Lu_2O_3$. Note that $CeO_2$—$ZrO_2$ is a solid solution of $CeO_2$ and $ZrO_2$. Whether a solid solution of $CeO_2$ and $ZrO_2$ has been formed can be confirmed by checking whether or not a single phase derived from $CeO_2$—$ZrO_2$ is formed, using an X-ray diffraction (XRD) apparatus.

In particular, from the viewpoint of the balance between heat resistance and OSC, the amount of $CeO_2$ contained in the first catalyst layer 14 is preferably 10 to 45 mass %, and more preferably 15 to 35 mass %. The amount of $ZrO_2$ contained in the first catalyst layer 14 is preferably 20 to 55 mass %, and more preferably 25 to 45 mass %. The preferred amounts of $CeO_2$ and $ZrO_2$ used here include the amounts of $CeO_2$ and $ZrO_2$ in the form of a solid solution.

The inorganic oxide other than an oxygen storage component that can be contained in the first catalyst layer 14 may be a metal oxide other than an oxygen storage component. Examples thereof include alumina, silica, silica-alumina, titania, and aluminosilicates. In particular, alumina is preferably used from the viewpoint of heat resistance. The amount of alumina contained in the first catalyst layer 14 is preferably 8 to 30 mass %, and more preferably 10 to 25 mass %.

A preferred composition of the second catalyst layer 15 will be further described. It is preferable that the second catalyst layer 15 further contains a carrier component that supports the catalytically active component from the viewpoint of causing the catalytically active component to efficiently exhibit exhaust gas purification performance. As the carrier component, those similar to the metal oxides listed above for the first catalyst layer 14, such as an inorganic oxide that acts as an oxygen storage component and an inorganic oxide other than an oxygen storage component, can be used.

As the inorganic oxide that acts as an oxygen storage component, those similar to the inorganic oxides that each act as an oxygen storage component listed above for the first catalyst layer 14 can be used. Out of these, in particular, ceria or a ceria-zirconia composite oxide is preferably used because the exhaust gas purification catalyst can have high OSC. In particular, from the viewpoint of the balance between heat resistance and OSC, the amount of $CeO_2$ contained in the second catalyst layer 15 is preferably 3 to 30 mass %, and more preferably 5 to 20 mass %. The amount of $ZrO_2$ contained in the second catalyst layer 15 is preferably 35 to 75 mass %, and more preferably 40 to 70 mass %. The preferred amounts of $CeO_2$ and $ZrO_2$ used here include the amounts of $CeO_2$ and $ZrO_2$ in the form of a solid solution.

As the inorganic oxide other than an oxygen storage component that can be contained in the second catalyst layer 15, those similar to the inorganic oxides listed above for the first catalyst layer 14 can be used. In particular, alumina is preferably used from the viewpoint of having excellent heat resistance. The amount of alumina in the second catalyst layer 15 is preferably 5 to 40 mass %, and more preferably 5 to 25 mass %.

The first catalyst layer 14 may be formed inside the partition wall 23 or on the surface of the partition wall 23, but it is preferable that the first catalyst layer 14 is formed on the surface of the partition wall 23, because exhaust gas purification performance during high speed driving can be improved even further. As used herein, the expression "the first catalyst layer 14 is formed on the surface of the partition wall 23" refers to a state in which the first catalyst layer 14 is present mainly on the surface of the partition wall 23, instead of inside the partition wall 23. More specifically, for example, whether the first catalyst layer 14 is present mainly on the surface can be checked by observing a cross section of the partition wall where the first catalyst layer 14 is provided, using a scanning electron microscope (JEM-ARM200F available from JEOL, Ltd.), and performing a method in which energy dispersive X-ray spectrometry (EDS) is performed to line-analyze the boundaries between elements (for example, Si, Mg, and the like) that are present only in the substrate and elements (for example, Ce, Zr, and the like) that are present only in the catalyst layer, or a method in which analysis is performed using an electron probe micro analyzer (EPMA).

Note that, as used herein, the expression "is present mainly on the surface" refers to a state in which, when the exhaust gas purification catalyst 10 is observed in a cross section taken along a plane perpendicular to the axis direction, the mass of the first catalyst layer 14 that is present on the surface of the partition wall 23 per unit cross section thereof is larger than the mass of the first catalyst layer 14 present inside the partition wall 23 per the same unit cross section.

The second catalyst layer 15 may be formed on the surface of the partition wall 23 or inside the partition wall 23, but it is preferable that at least a portion of the second catalyst layer 15 is present inside the partition wall 23. From the viewpoint of, for example, reducing pressure loss and improving exhaust gas purification performance during high speed driving, the second catalyst layer 15 preferably has, in a region extending from the downstream end portion R2 toward the upstream side in the exhaust gas flow direction X by a length (0.1L) corresponding to 1/10 of the length L of the substrate, a larger mass in a portion that is present inside the partition wall 23 than in a portion that is present on the surface of the partition wall.

FIG. 3 schematically shows a state in which the first catalyst layer 14 is formed on the surface of the partition wall 23, and the second catalyst layer 15 is formed inside the partition wall 23. As shown in FIG. 3, even if a catalyst layer is present inside a partition wall 23, it is preferable that, in the thickness direction of the partition wall 23, the catalyst layer is present closer to the cell to which it is applied.

Next, a preferred method of producing an exhaust gas purification catalyst according to the present invention will be described.

The production method includes the following steps (1) to (3). Steps (1) and (2) may be performed in any order.

(1) The step of applying a slurry for forming the first catalyst layer 14 to an inflow-side cell 21 side of the partition wall 23 and then drying the slurry, the slurry containing a first catalytically active component and metal oxide particles of a metal oxide having a D90 of 3 μm or greater.

(2) The step of applying a slurry for forming the second catalyst layer 15 to an outflow-side cell 22 side of the partition wall 23 and then drying the slurry, the slurry containing a second catalytically active component that is different from the first catalytically active component and metal oxide particles having a D90 of 5 μm or less.

(3) The step of calcining the substrate 11 after steps (1) and (2).

For the metal oxide particles, an inorganic oxide that acts as an oxygen storage component, or an inorganic oxide other than an oxygen storage component, which were described above as a constituent component of the first catalyst layer 14 and the second catalyst layer 15, can be used. The catalytically active components used in steps (1) and (2) may be mixed, in a state of being water soluble salts such as a nitrate, with the metal oxide particles to obtain a slurry for forming the first catalyst layer 14 and a slurry for forming the second catalyst layer 15, respectively, and the obtained slurries may be applied to the substrate 11, and then calcined in step (3). Alternatively, the catalytically active components may be supported on the metal oxide particles in advance, and slurries may be formed using the metal oxide particles on which the catalytically active components are supported. In the case where the catalytically active components are supported on the metal oxide particles in advance, a method may be used in which metal oxide particles are impregnated with an aqueous solution of a water soluble salt of a catalytically active component and then calcined at a temperature of 350 to 550° C.

The slurry for forming the first catalyst layer 14 used in step (1) and the slurry for forming the second catalyst layer 15 used in step (2) may contain a binder for the purpose of allowing the metal oxide particles supporting the catalytically active component to come into close contact with the substrate. Examples of the binder include an alumina sol, a zirconia sol, and the like.

The metal oxide particles constituting the slurry for forming the first catalyst layer 14 used in step (1) and the metal oxide particles constituting the slurry for forming the second catalyst layer 15 used in step (2) preferably have different particle sizes D90. Note that D90 refers to the particle size at 90% in a volume-based cumulative distribution.

The metal oxide particles contained in the slurry for forming the first catalyst layer 14 have a particle size D90 of preferably 3 μm or greater, more preferably 5 μm or greater, even more preferably 10 μm or greater, and particularly preferably 15 μm or greater, from the viewpoint of successfully obtaining an exhaust gas purification catalyst in which the pore volume of pores within a predetermined pore size range on the upstream side in the direction X of the catalyst 10 is greater than that on the downstream side, and the viewpoint of heat resistance. The particle size D90 of the metal oxide particles contained in the slurry for forming the first catalyst layer 14 is preferably 80 μm or less, and more preferably 50 μm or less, from the viewpoint of improving the dispersiveness of the catalytically active component.

On the other hand, the metal oxide particles contained in the slurry for forming the second catalyst layer 15 have a particle size D90 of preferably less than 5 μm, more preferably less than 3 μm, and particularly preferably 1 μm or less, from the viewpoint of successfully obtaining an exhaust gas purification catalyst in which the first pore volume is greater than the second pore volume. The particle size D90 of the metal oxide particles contained in the slurry for forming the second catalyst layer 15 is preferably 0.1 μm or greater, from the viewpoint of heat resistance.

The particle size D90 of metal oxide particles as used herein may be the particle size of the metal oxide particles on which a catalytically active component is supported, or may be the particle size of the metal oxide particles before the catalytically active component is supported. It is sufficient that the particle size D90 is not less than the above-described preferred lower limit, or not greater than the above-described preferred upper limit, either before or after the catalytically active component is supported on the metal oxide particles.

Also, the particle size D90 of metal oxide particles can be measured, for example, in the manner described below. Specifically, an automatic sample feeder for a laser diffraction particle size distribution measurement apparatus (Microtrac SDC available from MicrotracBEL Corporation) is used, metal oxide particles are added to an aqueous solvent, ultrasonic waves of 40 W are applied for 360 seconds at a flow rate of 40%, and thereafter measurement is performed using a laser diffraction scattering particle size distribution analyzer (Microtrac MT3300 EXII available from MicrotracBEL Corporation). Measurement conditions are set as follows: the particle's refractive index is 1.5; the particle shape is a perfect sphere; the solvent's refractive index is 1.3; the set zero time is 30 seconds; the measurement time is 30 seconds; and measurement is performed twice, and the average value is obtained. Pure water is used as the aqueous solvent.

The slurry for forming the first catalyst layer 14 used in step (1) preferably contains a pore-forming material from the viewpoint of successfully obtaining an exhaust gas purification catalyst in which the first pore volume is greater than the second pore volume. As the pore-forming material, for example, cross-linked polymethyl(meth)acrylate particles, cross-linked polybutyl(meth)acrylate particles, cross-linked polystyrene particles, cross-linked polyacrylic acid ester particles, or the like can be used. The pore-forming material preferably has an average particle size D50 of 0.1 to 100 μm. D50 means the particle size at 50% in a volume-based cumulative distribution, and can be obtained using a method similar to the method for obtaining D90 described above.

In order to apply the slurry for forming the first catalyst layer 14 used in step (1) to the substrate 11, a method may be used in which the upstream side of the substrate 11 in the exhaust gas flow direction is immersed in the slurry. The slurry may be drawn by suction from the downstream side at the same time as when the substrate 11 is immersed. With this method, the slurry for forming the first catalyst layer 14 is applied to a surface of the partition wall 23 that faces the inflow-side cell on the upstream side of the substrate 11 in the direction X through the opening portion of the inflow-side cell on the upstream side. Due to the particle size of the metal oxide particles described above, most of the metal oxide that constitutes the first catalyst layer 14 is located on the surface of the partition wall 23.

In order to apply the slurry for forming the second catalyst layer 15 used in step (2) to the substrate 11, a method may be used in which the downstream side of the substrate 11 in the exhaust gas flow direction is immersed in the slurry. The slurry may be drawn by suction from the upstream side at the same time as when the substrate 11 is immersed. With this method, the slurry for forming the second catalyst layer 15 is applied to a surface of the partition wall 23 that faces the outflow-side cell on the downstream side of the substrate 11 in the direction X through the opening portion of the outflow-side cell on the downstream side. As described above, although the second catalyst layer 15 may be present inside the partition wall 23 or on the surface of the partition wall 23, it is preferable that at least a portion of the second catalyst layer 15 is present inside the partition wall 23, and it is preferable that the portion of the second catalyst layer 15 that is present inside the partition wall 23 is larger than a portion thereof that is present on the surface of the partition wall 23.

From the viewpoint of successfully obtaining a catalyst that has good CO adsorption performance and OSC performance, the drying temperatures for drying the slurries in steps (1) and (2) are preferably 40 to 120° C. The calcining temperature in step (3) is preferably 350 to 550° C.

The amount of the obtained first catalyst layer 14 is preferably less than the amount of the obtained second catalyst layer 15, from the viewpoint of reducing pressure loss and the viewpoint of exhaust gas purification performance during high speed driving. The coating amount of the first catalyst layer 14 is preferably 50 g or less per liter of substrate volume from the viewpoint of reducing pressure loss and the viewpoint of, for example, exhaust gas purification performance during high speed driving, and is preferably 5 g or greater from the viewpoint of improving exhaust gas purification performance and the viewpoint of favorable PM collection. In particular, the coating amount of the first catalyst layer 14 is more preferably 8 g or greater, or 40 g or less.

The coating amount of the second catalyst layer 15 is preferably 80 g or less per liter of substrate volume from the viewpoint of reducing pressure loss, for example, and is preferably 20 g or greater from the viewpoint of improving exhaust gas purification performance. In particular, the coating amount of the second catalyst layer 15 is more preferably 30 g or greater, or 70 g or less.

When the exhaust gas purification catalyst obtained through the above-described production method is used as a particulate filter, as shown in FIG. 2, exhaust gas flows into the catalyst from the inflow-side cells 21 of the substrate 11. The exhaust gas flowing into the catalyst from the inflow-side cells 21 passes through the porous partition walls 23, and reaches the outflow-side cells 22. In FIG. 2, the routes along which the exhaust gas flowing into the catalyst from the inflow-side cells 21 passes through the partition walls 23 and reaches the outflow-side cells 22 are indicated by arrows. At this time, because the partition walls 23 have a porous structure, PM is collected on the surfaces of the partition walls 23 and in the pores inside the partition walls 23 while the exhaust gas passes through the partition walls 23. Also, because each partition wall 23 is provided with a first catalyst layer 14 and a second catalyst layer 15, harmful components contained in the exhaust gas are purified while the exhaust gas passes through the inside and the surface of the partition wall 23. Exhaust gas that has passed through the partition walls 23 and reached the outflow-side cells 22 is discharged to the outside of the exhaust gas purification catalyst 10 through the openings on the exhaust gas outflow side.

With this exhaust gas purification catalyst 10, since different catalytically active components are separately supported on the first catalyst layer 14 and the second catalyst layer 15 of the substrate 11, the catalytically active components are highly dispersed, and in addition thereto, since the configuration in which the first pore volume is greater than the second pore volume is employed, exhaust gas purification performance, especially during high speed driving, is good. This exhaust gas purification catalyst 10 according to the present invention has excellent exhaust gas purification performance.

Note that, in the present invention, as a method of measuring the amounts of ceria and zirconia as well as an inorganic oxide other than an oxygen storage component, of the above-described various components, a method can be employed in which the amounts of metals, such as cerium, zirconia, and aluminum, in a solution obtained by completely dissolving each catalyst layer are measured using ICP-AES. Moreover, the amounts of the catalytically active components contained per single porous substrate 11 can be determined by, for example, measuring the amounts of noble metals in a solution obtained by completely dissolving the catalyst layers using ICP-AES.

Note that, in the case where a catalyst layer is provided inside the partition wall of the substrate, the amounts of the catalytically active components can be determined by subtracting the amounts of metals contained in a solution obtained by completely dissolving only the substrate from the amounts of metals contained in a solution obtained by completely dissolving the catalyst layers and the substrate.

EXAMPLES

Hereinafter, the present invention will be described in greater detail using examples. However, the scope of the present invention is not limited to the examples below. Note that both drying and calcining steps were performed in the atmosphere.

Example 1

1. Preparation of Slurries

A $CeO_2$—$ZrO_2$ solid solution powder with a particle size D90 of 20 μm (the $CeO_2$—$ZrO_2$ solid solution containing 40 mass % of $CeO_2$ and 50 mass % of $ZrO_2$) and an alumina powder with a particle size D90 of 20 μm were prepared. The $CeO_2$—$ZrO_2$ solid solution powder and the alumina powder were mixed at a mass ratio of 3:1, and the mixture was impregnated with an aqueous solution of palladium nitrate.

Next, the resulting mixed solution was mixed with a pore-forming material (cross-linked polymethyl(meth)acrylate particles), an alumina sol, a zirconia sol, and water serving as a liquid medium, to prepare a slurry for the first catalyst layer 14.

On the other hand, a $CeO_2$—$ZrO_2$ solid solution powder with a particle size D90 of 0.5 μm (the $CeO_2$—$ZrO_2$ solid solution containing 15 mass % of $CeO_2$ and 70 mass % of $ZrO_2$) and an alumina powder with a particle size D90 of 0.5 μm were mixed, and the mixture was impregnated with an aqueous solution of rhodium nitrate.

Next, the resulting mixed solution was mixed with an alumina sol, a zirconia sol, and water serving as a liquid medium, to prepare a slurry for forming the second catalyst layer 15.

2. Formation of Catalyst Layers

As the substrate 11, a substrate 11 was used that had the structure shown in FIG. 1, included 300 cells/inch in a plane perpendicular to the axis direction, each cell being defined by cell partition walls with a thickness of 215 μm and extending in the axis direction, and had an outer diameter of 118.4 mm and an axial length of 91 mm. In a pore size distribution (measurement range: 1 to 1,000,000 nm) that was measured using a similar method to those for the first pore volume and the second pore volume, the substrate 11 had a peak within a range of 10 to 25 μm.

The substrate 11 was coated with the slurry for forming the first catalyst layer 14 in the following manner. An upstream end portion of the catalyst carrier substrate 11 in the exhaust gas flow direction was immersed in the slurry, and the slurry was drawn by suction from the downstream side. Then, the substrate was dried at 70° C. for 10 minutes.

The substrate 11 was coated with the slurry for forming the second catalyst layer 15 in the following manner. A downstream end portion of the catalyst carrier substrate 11 in the exhaust gas flow direction was immersed in the slurry, and the slurry was drawn by suction from the upstream side. Then, the substrate was dried at 70° C. for 10 minutes.

After that, the substrate was calcined at 450° C. for one hour. Thus, an exhaust gas purification catalyst 10 of Example 1 was obtained. The obtained first catalyst layer 14 was composed of 27.4 mass % of $CeO_2$, 37.5 mass % of $ZrO_2$, 19.6 mass % of alumina, and 9.5 mass % of Pd. On the other hand, the second catalyst layer 15 was composed of 12.3 mass % of $CeO_2$, 62.8 mass % of $ZrO_2$, 11.2 mass % of alumina, and 0.5 mass % of Rh.

Also, in the exhaust gas purification catalyst of Example 1, the first catalyst layer 14 of the exhaust gas purification catalyst 10 was formed on a surface of the partition wall 23 that faced the inflow-side cell 21 so as to extend from the upstream end portion R1 toward the downstream side in the exhaust gas flow direction X to 40% of the overall length L, and the coating amount relative to a volume of 1 L of the substrate was 10 g. The amount of Pd contained in the first catalyst layer 14 was 0.95 g relative to a volume of 1 L of the substrate.

The second catalyst layer 15 of the exhaust gas purification catalyst 10 was formed inside the partition wall 23 that faced the outflow-side cell 22 so as to extend from the downstream end portion R2 toward the upstream side in the exhaust gas flow direction X to 70% of the overall length L, and the coating amount relative to a volume of 1 L of the substrate was 50 g. The amount of Rh contained in the second catalyst layer 15 was 0.25 g relative to a volume of 1 L of the substrate. Note that the exhaust gas purification catalyst was designed such that the volume of the substrate (volume including not only the substrate 11 portion but also the first catalyst layer 14 and the second catalyst layer 15, pores in the partition wall 23, as well as spaces in the cells 21 and 22) was 1 L.

Examples 2 and 3

Exhaust gas purifying catalysts of Examples 2 and 3 were obtained in similar manners to that of Example 1, except that the conditions were changed to those shown in Table 1.

Comparative Example 1

When preparing a slurry for forming the first catalyst layer 14, the mixed powder of the $CeO_2$—$ZrO_2$ solid solution and alumina was impregnated with an aqueous solution of palladium nitrate and rhodium nitrate, instead of the aqueous solution of palladium nitrate, to cause the mixed powder to support Pd and Rh at a mass ratio Pd:Rh of 4:1. The amounts of noble metals supported on the mixed powder were the same as those of Example 1. Moreover, when preparing a slurry for forming the second catalyst layer 15, the mixed powder of the $CeO_2$—$ZrO_2$ solid solution and alumina was impregnated with an aqueous solution of palladium nitrate and rhodium nitrate, instead of the aqueous solution of rhodium nitrate, to cause the mixed powder to support Pd and Rh at a mass ratio Pd:Rh of 4:1. The amounts of noble metals supported on the mixed powder were the same as those of Example 1. Otherwise, a similar procedure to that of Example 1 was performed, and thus, an exhaust gas purification catalyst of Comparative Example 1 was obtained. The amounts of Pd and Rh per substrate volume were the same as those of Example 1.

Comparative Examples 2 and 3

An exhaust gas purification catalyst was obtained in a similar manner to that of Comparative Example 1, except that the conditions were changed to those shown in Table 1.

Measurement of Pore Volumes

For each of the catalysts of the examples and the comparative examples, 1 $cm^3$ cubes (cubes with each side having a length of 1 cm) were cut out from a portion of the partition wall 23 at a position spaced apart from the upstream end portion R1 of the exhaust gas purification catalyst 10 toward the downstream side by a distance corresponding to 10% of the overall length L of the substrate 11 according to the above-described method, and the cut-out cubes were used as upstream samples.

Likewise, 1 $cm^3$ cubes (cubes with each side having a length of 1 cm) were cut out from a portion of the partition wall 23 at a position spaced apart from the downstream end portion R2 toward the upstream side by a distance corresponding to 10% of the overall length L, and the cut-out cubes were used as downstream samples.

Table 1 shows the pore volumes of pores with a pore size of 10 to 18 μm on the upstream side and the downstream side, of the examples and the comparative examples.

Measurement of CO Adsorption Amount after Endurance

The slurry for forming the first catalyst layer 14 and the slurry for forming the second catalyst layer 15 used in each of the examples and the comparative examples were calcined at 500° C. for 2.5 hours. After that, the whole amount of the obtained calcined powder of the slurry for forming the first catalyst layer 14 and the whole amount of the obtained calcined powder of the slurry for forming the second catalyst layer 15 were mixed to prepare a mixed powder of the catalyst layers. This mixed powder was attached to a model exhaust gas flow path, and subjected to an endurance test at 1,000° C. for 10 hours in air containing 10 vol % of water vapor under conditions of A/F within a range of 13.6 to 15.6.

After the endurance test, for each of the mixed powders of the catalyst layers of the examples and the comparative examples, the CO adsorption amount was calculated using a CO-pulse method. In measurement of the CO adsorption amount, the mixed powder of the catalyst layers was placed into a testing gas flow vessel (BEL-METAL-3 available from MicrotracBEL Corporation). First, pretreatment was performed as follows: the temperature was increased to 400° C. under a He flow, then, with the temperature kept at 400° C., oxidation treatment was performed for 15 minutes under an $O_2$ flow, and reduction treatment was performed for 15 minutes under a $H_2$ flow, and then the temperature was decreased to 50° C. under a He flow. After that, with the temperature kept at 50° C., 25 vol % CO and 75 vol % He were injected in pulses until the CO adsorption amount was saturated, and the total CO adsorption amount was measured. Then, the CO adsorption amount (ml/g) per unit coating amount was calculated. Note that a TCD was used as the detector.

Measurement of OSC Performance after Endurance

For each of the mixed powders of the catalyst layers of the examples and the comparative examples after the above-described endurance test, OSC was measured using a CO-pulse method. In OSC measurement, the exhaust gas purification catalyst was placed into a testing gas flow vessel (AutoChem II 2920 available from Micromeritics Instrument Corporation). The temperature was increased to 600°

C. under a He flow, and kept at this temperature for 10 minutes. With the temperature still kept at 600° C., oxygen treatment was performed by injecting an $O_2$ gas in three pulses, and then reduction treatment was performed by injecting 10 vol % CO and 90 vol % He in twenty pulses. Then, an $O_2$ gas was injected in four pulses, and the OSC amount (µmol/g) per unit mass at a temperature of 600° C. was determined from the amount of 02 gas that was absorbed. Note that a TCD was used as the detector. The temperature was changed from 600° C. to 400° C. and 800° C., and the OSC amounts at these temperatures were also determined.

Measurement of $NO_x$ Emission Amount During High Speed Driving

Each of the exhaust gas purification catalysts of the examples and the comparative examples was placed in an exhaust path of an engine, and subjected to the following endurance conditions as a test for degradation after driving 100,000 to 200,000 kilometers.

Endurance Conditions
  Engine used for endurance test: 2 L NA gasoline engine for passenger vehicles
  Gasoline used: commercially available regular gasoline
  Temperature and time used for endurance test: 900° C. and 100 hrs.

After performing the endurance test under the above-described conditions, the exhaust gas purification catalyst that had undergone the endurance test was installed in a vehicle described below. As a vehicle test, the vehicle was driven in accordance with the driving conditions of the Worldwide Harmonized Light Vehicles Test Cycles (WLTC). The total emission amount (emission value "Total") of $NO_x$ contained in the exhaust gas during a period from when driving started to when driving stopped, and the emission amount (emission value "Ex High") of $NO_x$ contained in the exhaust gas during a high speed driving period (1,478 seconds to 1,800 seconds from the start of driving) were measured. Table 1 shows the emission values.

Conditions for Measuring Purification Rate
  Vehicle used for evaluation: vehicle mounted with 1.5 L gasoline direct injection turbo engine
  Gasoline used: fuel for verification test
  Exhaust gas measurement apparatus: exhaust gas measurement apparatus available from HORIBA, Ltd.

As shown in Table 1, compared with the exhaust gas purification catalysts of the comparative examples, the exhaust gas purification catalysts of the examples exhibited greater CO adsorption amounts after thermal endurance and greater OSC amounts at any of the temperatures 400° C., 600° C., and 800° C. The greater OSC amounts at the respective temperatures indicate that the exhaust gas purification catalyst according to the present invention can exhibit sufficient OSC even when it is disposed at various positions of different temperature environments, such as a position on the upstream side in the exhaust gas flow direction and a position on the downstream side. Moreover, compared with the exhaust gas purification catalysts of the comparative examples, the exhaust gas purification catalysts of the examples not only exhibited less $NO_x$ emission amounts during a high speed driving period, but also exhibited less total $NO_x$ emission amounts during the entire driving period including a low speed driving period and a medium speed driving period. As described above, the exhaust gas purification catalyst according to the present invention has excellent CO adsorption performance after thermal endurance and excellent OSC in a wide temperature range as well as good exhaust gas purification performance during high speed driving, and therefore, has excellent exhaust gas purification performance.

INDUSTRIAL APPLICABILITY

According to the present invention, it is possible to improve CO adsorption performance and oxygen storage performance (OSC) after thermal endurance of a filter catalyst that has a wall flow structure, and also improve exhaust gas purification performance during high speed driving of the filter catalyst.

The invention claimed is:
1. An exhaust gas purification catalyst comprising:
a substrate; and
a catalyst portion provided in the substrate,
the substrate including:
  an inflow-side cell including a space whose inflow-side in an exhaust gas flow direction is open and whose outflow-side is closed;
  an outflow-side cell including a space whose inflow-side in the exhaust gas flow direction is closed and whose outflow-side is open; and
  a porous partition wall that separates the inflow-side cell and the outflow-side cell from each other, and

TABLE 1

| | First catalyst layer Coating amount | First catalyst layer D90 | Second catalyst layer Coating amount | Second catalyst layer D90 | First catalyst layer Pore volume of 10-18 µm | Second catalyst layer Pore volume of 10-18 µm | Pore volume ratio (Second catalyst layer/ First catalyst layer) | First catalyst layer Type of catalytically active component | Second catalyst layer Type of catalytically active component | Aged CO adsorption amount | Aged OSC amount @400° C. | Aged OSC amount @600° C. | Aged OSC amount @800° C. | NOx purification (EX High) | NOx purification (Total) |
|---|---|---|---|---|---|---|---|---|---|---|---|---|---|---|---|
| | g/L | µm | g/L | µm | cm³/g | cm³/g | | | | ml/g | µmol/g | µmol/g | µmol/g | g/km | g/km |
| Ex. 1 | 10.0 | 20.0 | 50.0 | 0.5 | 0.264 | 0.111 | 0.421 | Pd | Rh | 0.0747 | 22.13 | 169.30 | 187.77 | 0.0023 | 0.0093 |
| Ex. 2 | 20.0 | 20.0 | 50.0 | 0.5 | 0.224 | 0.151 | 0.675 | Pd | Rh | 0.0772 | 40.37 | 195.69 | 222.42 | 0.0019 | 0.0092 |
| Ex. 3 | 21.8 | 20.0 | 38.2 | 0.5 | 0.252 | 0.180 | 0.715 | Pd | Rh | 0.0719 | 34.92 | 182.27 | 209.26 | 0.0020 | 0.0094 |
| Com. Ex. 1 | 10.0 | 20.0 | 50.0 | 0.5 | 0.253 | 0.151 | 0.599 | PdRh | PdRh | 0.0641 | 7.56 | 98.38 | 89.63 | 0.0048 | 0.0129 |
| Com. Ex. 2 | 20.0 | 20.0 | 50.0 | 0.5 | 0.213 | 0.151 | 0.710 | PdRh | PdRh | 0.0655 | 9.71 | 116.52 | 110.39 | 0.0044 | 0.0127 |
| Com. Ex. 3 | 21.8 | 20.0 | 38.2 | 0.5 | 0.236 | 0.176 | 0.743 | PdRh | PdRh | 0.0678 | 7.03 | 121.32 | 139.40 | 0.0045 | 0.0129 | the catalyst portion including:
- a first catalyst portion that is provided at least on a portion of a side of the partition wall that faces the inflow-side cell, the portion being located on an upstream side in the flow direction; and
- a second catalyst portion that is provided at least on a portion of a side of the partition wall that faces the outflow-side cell, the portion being located on a downstream side in the flow direction, wherein, with respect to a pore volume of pores with a pore size of 10 to 18 μm, a first pore volume is greater than a second pore volume, wherein the first pore volume is a measured value of the pore volume in the first catalyst portion and the partition wall within a region where the first catalyst portion is provided, and the second pore volume is a measured value of the pore volume in the second catalyst portion and the partition wall within a region where the second catalyst portion is provided, both the first catalyst portion and the second catalyst portion contain a catalytically active component, and the catalytically active component contained in the first catalyst portion in the greatest amount differs from the catalytically active component contained in the second catalyst portion in the greatest amount, the catalytically active components contained in the first catalyst portion and the second catalyst portion are each at least one selected from a group consisting of Pt, Pd, and Rh, the first catalyst portion is present mainly on the surface of the partition wall, and in a region extending from a downstream end portion toward the upstream side in the exhaust gas flow direction by a length corresponding to $1/10$ of a length L of the substrate, the second catalyst portion has a larger mass in a portion that is present inside the partition wall than in a portion that is present on the surface of the partition wall.

2. The exhaust gas purification catalyst as set forth in claim 1,
wherein, when the first pore volume is taken as 1, the second pore volume is 0.95 or less.

3. The exhaust gas purification catalyst as set forth in claim 1,
wherein the catalytically active component contained in the first catalyst portion is Pd, and
the catalytically active component contained in the second catalyst portion is Rh.

* * * * *